TORQUE RESPONSIVE BRAKE WITH PIVOTED FRICTION INSERTS
Filed Aug. 14, 1967
2 Sheets-Sheet 1
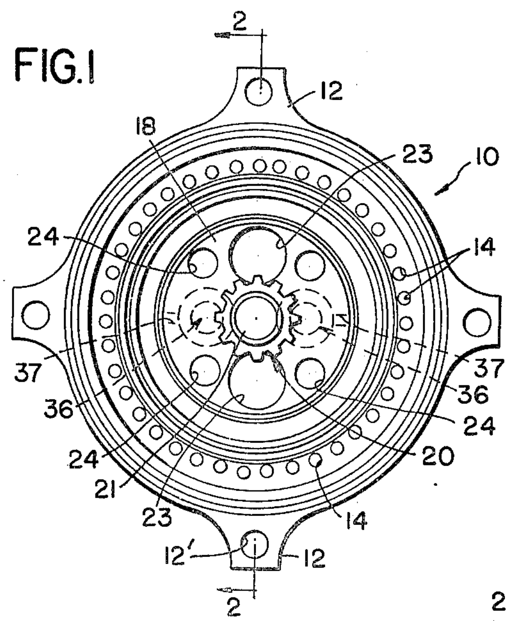
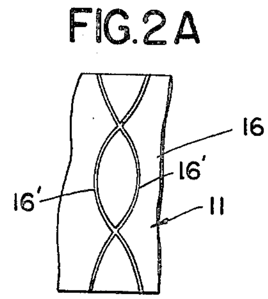
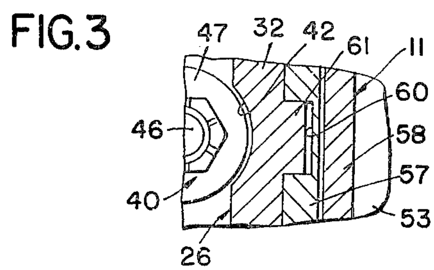
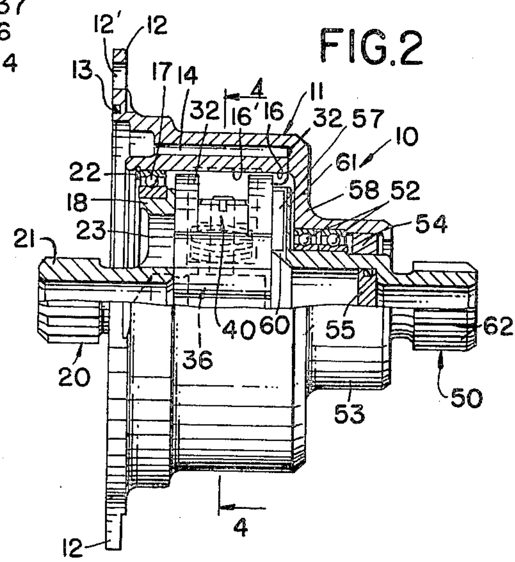
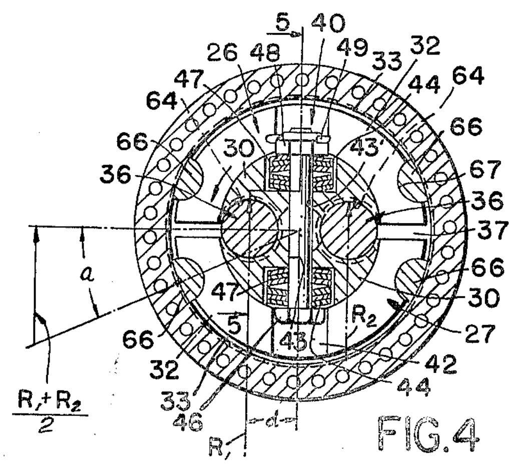
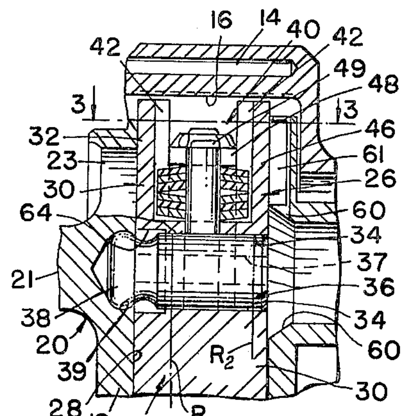
INVENTOR.
ILMARS KALNS
BY Whittemore, Hulbert & Belknap
ATTORNEYS TORQUE RESPONSIVE BRAKE WITH PIVOTED FRICTION INSERTS
Filed Aug. 14, 1967
2 Sheets-Sheet 2
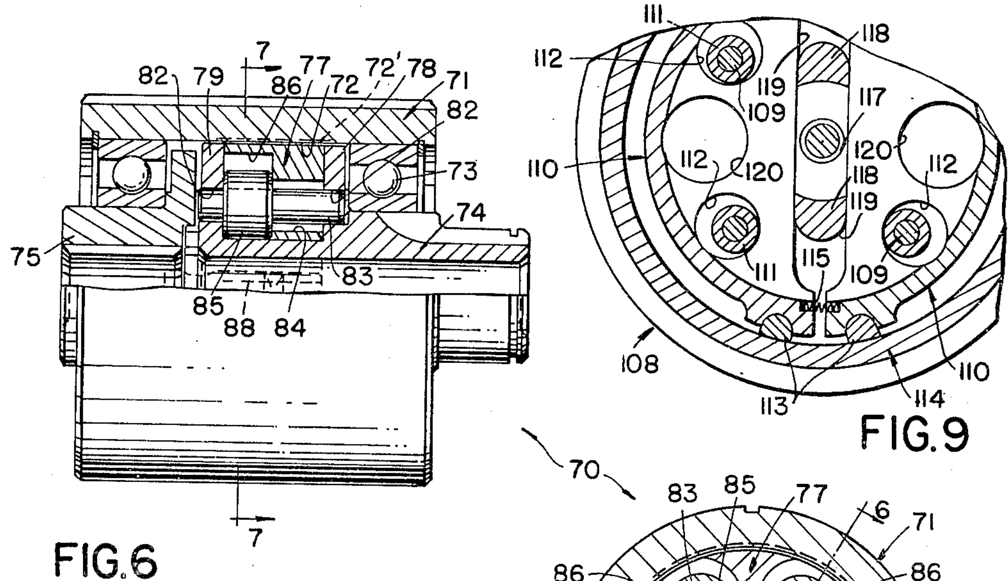
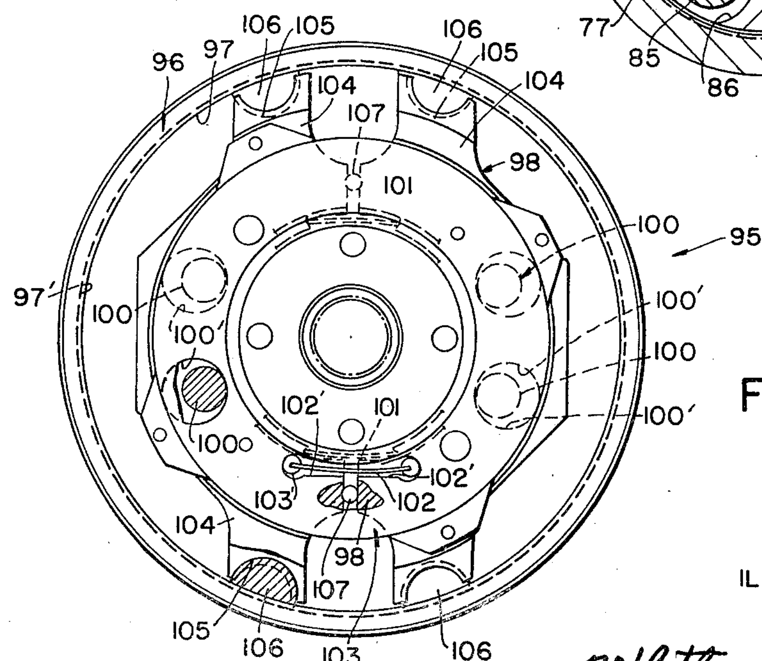
INVENTOR
ILMARS KALNS
BY Whittemore, Hulbert & Belknap
ATTORNEYS United States Patent Office 3,497,044
Patented Feb. 24, 1970

3,497,044
TORQUE RESPONSIVE BRAKE WITH PIVOTED FRICTION INSERTS

Ilmars Kalns, Taylor, Mich., assignor to Formsprag Company, Warren, Mich., a corporation of Michigan Filed Aug. 14, 1967, Ser. No. 660,416
Int. Cl. F16d *69/00*
U.S. Cl. 192—8 26 Claims

ABSTRACT OF THE DISCLOSURE

A torque-sensing and limiting, brake shoe and drum type unit is disclosed for the transmission of mechanical power in either rotative direction from an input side to an output side. The device acts to protect the output side components from excessive torque, intermittent or otherwise, available at the up-stream or power input side.

To these ends, in a preferred illustrative form, a pair of diametrically opposed brake shoes of an improved type are maintained, in the normal operation of the clutch at a predetermined load, out of radial engagement with a cylindrical brake drum surface under an adjustable radially acting spring force, which force is set at a value to keep the shoes from locking out against the drum surface. The normal driving torque is transmitted positively from the input and through the shoes to the output side through the agency of a dual pin type connection of the driver to the shoes, i.e., a pair of ball-ended driver pins extending into the diametral space between the shoes, plus a jaw-type tongue and groove connection of the shoes to an output member. In another form, embodied in a clutch, there is a pin and pintle drive connection of the shoes to the output member. In still another alternative embodiment, the output pins could be replaced by a simple tang-type drive. When a condition of greater than normal torque arises on the input side, in a no-back embodiment, in the operation of the preferred form, the load causes a reactive force to be exerted on the pins to spread the shoes radially outwardly against the drum. This grounds out the excess value of the input torque until the latter equates with that of the torque designed for the output side.

The shoes, whether in a no-back or clutch unit, are also of an improved type, in that they have a substantial radial clearance inwardly of the brake drum surface, other than at the circumferentially spaced location of shoe inserts of extreme hardness, which are used for the actual braking engagement with the drum. The inserts are of a hardness such as would be very expensive and impractical, perhaps even impossible, to provide on a shoe of one-piece construction. Moreover, each insert pivots on an inner convex surface in a generally semi-cylindrical concave seat in the shoe, thus insuring a uniform and low unit pressure radial loading of the insert against the drum surface, as the reversing operation of the device goes on. The shoe inserts, as thus constructed, are minimally subject to deterioration under wear, hence improve the uniform characteristics of the clutch in respect to output lash, input lash, and slip factor.

CROSS REFERENCE TO RELATED APPLICATIONS

The improvement of the invention is in a general way related to a bi-directional no-back drive device which is the subject matter of my co-pending application, Ser. No. 503,381, filed Oct. 23, 1965, now Letters Patent No. 3,335,831 of Aug. 15, 1967. It is also, therefore, related to my further co-pending application, Ser. No. 605,872, filed Dec. 29, 1966 and titled "Balanced Bi- Directional No-Back Drive Mechanism," now Letters Patent No. 3,414,095 of Dec. 3, 1968, which discloses other improvements on the subject matter of my Patent No. 3,335,831. Also related in a very general way is a copending application of common ownership in the name of Giovan B. Candela, Ser. No. 614,340, filed Feb. 6, 1967, now Letters Patent No. 3,335,832 of Aug. 15, 1967, on a sprag type unit.

BACKGROUND OF THE INVENTION

The torque-sensing device of the present invention finds application in the general field of clutches in which it is desired to protect or insulate the driven side of a rotary power transmission line from excessive intermittent surges of input torque, or a continually though variably excessive torque applied by the input side of the line; and vice versa. Thus, a normal drive power continuously transmits through the improved device to the output side; and excesses are automatically and substantially instantaneously grounded out at the coacting brake and drum components of the device. Typically, in the past, the purpose has been served by a slip-type friction connection between the drive and driven sides. However, a positive and substantially instantaneous safeguarding of the output from the input overload, pursuant to the present invention, has many advantages in many applications.

I am at present unaware of any prior art disclosures of a brake shoe and drum type safety and torque sensing clutch device of the nature referred to in the abstract.

SUMMARY OF THE INVENTION

The improved unit, in one embodiment, is a safety device for use in a mechanical power transmission system in which output components require protection from excessive torques available upstream from a power source. The device has the advantage that its normal input and output connections may be optionally reversed, the output side serving as a driver for the normal input side, and vice versa.

In normal operation the input side applies torque to the ball-shaped ends of a pair of spaced input pins paralleling and on either side of the axis of power transmission, which pins tend unsuccessfully to pry apart a pair of diametrically spaced brake shoes against opposition by a preset very substantial but adjustable spring force. This force is set to keep the shoes from locking out against a cylindrical brake drum while normal driving torque is in effect. The shoe assembly has a positive tongue and slot type of drive relationship with the output, allowing the normal driving torque to be transmitted through the shoes to the output.

However, should a higher than normal torque occur on the input side, the reactive pin forces exceed the preset spring force and thus pry the shoes apart, grounding the excess torque to the drum in a substantially instantaneous way, until the input is braked or returns to a normal and permissible torque value. In this manner, the output can experience only the desired level of driving torque, regardless of what excess may be continually or intermittently applied to the input. It is evident that the protection may also extend in the opposite axial sense from an intermittently overloaded output to a constantly powered input; and, as indicated, either side of the device may be the driver.

As a structural improvement of importance, whether embodied in a no-back unit or a clutch unit, each of the two brake shoes is provided, adjacent the circumferential end portions thereof adjoining the diametral space separating the two shoes, with a hardened brake drum engaging insert having an outer arcuate surface of limited circumferential extent, and of a curvature the same as the brake drum, and a generally semicylindrical inner seating surface mated in a seat in the shoe proper; and these inserts serve several purposes.

First, they provide an easily replaceable wear surface of extreme hardness, such as a chrome treated or hard carbide surface, which would be expensive or even impossible to manufacture integral with the shoe.

Second, the insert may pivot on its internal surface in the brake shoe seat as the device operates, insuring uniform and low unit pressure loading and wear of the insert surface in contact with the outer brake race. This is unlike the conventional solid shoe in which only one edge of the contact surface—the one farthest from a centerline along the split between shoes—takes all of the wear.

Third, the insert makes such performance characteristics as output lash, input lash, slip factor and efficiency less susceptible to deterioration due to wear of the contact surfaces. Briefly, in the usual arrangement these characteristics are functions of a critical angle between the diametral centerline along the spit of the shoe assembly and a line drawn from the axis of the clutch and the shoe assembly to the shoe's line of first contact of attack with the outer race, which angle would generally be of the order of 10 to 25 degrees. Hence when a slight wear occurs at the critical shoe edge or corner, the split between the shoe opens up considerably. This increases the critical angle referred to. There is consequently an increase in the output lash, and a decreasing of the "slip factor" and input lash, which could be dangerous if it prevented the shoe from locking out.

However, using the inserts, the critical angle is greatly reduced, being now defined by a line radially through the center of the insert and the center split line of the shoe. The contact surface is not only multiplied, it is also extended past the former critical wear point of the solid shoe into a steeper portion, circumferentially relative to the shoe, of the outer race or brake surface. As a result the same amount of wear results in a lesser opening of the split between shoes.

A fourth advantage is a more uniform loading of the outer race. The four line contacts of the solid shoe assembly are changed to four uniformly loaded area contacts, permitting the use of a lighter outer race, due to lower unit pressures.

As an improved alternative to a feature basically shown in my earlier Patent No. 3,414,095, the axially extending pin receiving recesses in the shoe are each radially relieved a bit at an axial end thereof. This is for the purpose of obtaining a uniform axial loading of the shoe along its length with the outer race. Since the pin reaction forces on the shoe, the forces $R_1$ and $R_2$ stated in a formula expressed in said application, are different, the relieved pin hole results in a lesser loading of that edge of the shoe, i.e., nearer the ball-shaped end of the more highly stressed pin, hence an equalization of the pin-to-shoe forces.

BRIEF DESCRIPTION OF THE DRAWINGS

FIG. 1 is an end elevational view, as from the left of FIG. 2, of the improved safety type, no-back device of the invention;

FIG. 2 is a view partially broken away and longitudinal axial cross section along line 2—2 of FIG. 1;

FIG. 2A is a development showing an internally grooved drum surface of the device of FIGS. 1 and 2, which also characterizes other embodiments;

FIG. 3 is a fragmentary view in enlarged scale along line 3—3 of FIG. 2 (see also FIG. 5), illustrating a tongue and groove type positive drive connection between a brake shoe part of the device and an output part;

FIG. 4 is a view in transverse cross section along line 4—4 of FIG. 2, this view also schematically showing the nature and application of certain reactive forces which are involved in the operation of the device;

FIG. 5 is an enlarged scale, fragentary view in longitudinal or axial cross section along broken line 5—5 of FIG. 4, more clearly illustrating the nature of the brake shoe biasing spring means and brake-applying pin means of the improvement;

FIG. 6 is a side elevational view, partially broken away and in section on line 6—6 of FIG. 7, showing an application of the brake insert principle to a clutch unit employing a different type of pin means, in which unit the brake shoe are resiliently urged apart, rather than toward one another.

FIG. 7 is a view in transverse vertical section on line 7—7 of FIG. 6;

FIG. 8 is a view in transverse vertical section through yet another type of clutch unit to which the brake insert feature is applied; and FIG. 9 is a fragmentary view in section similar to FIGS. 4 and 7, illustrating a tang-type drive arrangement for the shoes as an alternative to the pin type drives of the other forms.

DESCRIPTION OF A PREFERRED EMBODIMENT

The no-back unit of the invention is generally designated by the reference numeral 10. It comprises a fixed housing, generally designated by the reference numeral 11, which affords a number of outwardly projecting, flange-like ears 12, each apertured at 12 for the reception of bolt or like means to secure housing 11 to a fixed mount (not shown) of one sort or another, such as that of a prime mover. An O-ring 13 is provided inwardly of the ears 12 to provide an effective seal against the mount. Furthermore, housing 11 carries, radially inwardly of the seal 13, a multiplicity of circumferentially spaced holes 14 paralleling its axis, in the interest of lightness.

The interior of the housing is accurately machined to provide a cylindrical, inwardly facing brake drum surface 16. This surface is helically grooved at 16′, as shown in FIG. 2A, to allow a coolant or lubricant to wet the rubbing surfaces of the friction members to be described.

A ball bearing 17 fixedly mounted within one end of surface 16 rotatably mounts the cylindrical flange 18 of an input member or driver which is generally designated by the reference numeral 20. This member is externally splined, on an axial stem 21 thereof projecting to the left (FIG. 2) of housing 11, for a driving connection with an input power source and/or power transmission line from such source. Bearing 17 is retained axially in place by a split ring 22; and a radial flange 18 of input member 20 is, like the housing, provided with relatively large apertures 23, 24 for increased lightness in weight.

Referring now in particular to FIGS. 4 and 5, the housing 11 receives, interiorly of its drum surface 16, a pair of like brake shoes, generally designated 26, 27, respectively. These are located just to the right as viewed in FIGS. 2 and 5, of an inner radial face 28 of flange 18 of the input or driver member 20. The shoes 26 and 27 are identical, each comprising a radially inner body member 30, of substantial mass and semi-cylindrical cross section (FIG. 4) specially shaped in a manner to be described, and a pair of integral end flanges, also of generally semi-cylindrical outline but considerably greater radius, these flanges being designated 32. Their radius is only such that a substantial radial clearance exists at 33 between their outer periphery and the brake drum surface 16 of housing 11.

Each of the shoe body portions 13 is provided, on an inner chordal line and at points spaced equi-distantly on opposite sides of the axis of device 10, with an arcuate pin receiving seat 34 which is of concave and quasi-cylindrical outline. These seats extend across the axial dimension of the shoes 26, 27, and, furthermore, are specially contoured at an axial end thereof, in a manner and for a purpose to be hereinafter described.

Corresponding opposed seats 34 each receive therebetween a shoe actuating or control pin 36, which pins thereby separate the shoes 26, 27 from one another, in a normal power transmitting phase of operation, to the diametral extent of the split or spacing 17, see FIGS. 4 and 5.

Each pin 36 projects axially outwardly of the shoes 26, 27, or to the left as viewed in FIG. 5, and terminates in a rounded or quasi-ball-shaped head 38. These heads are received in correspondingly spaced recesses 39 of cylindrical shape in the inner side of power input member 20 (FIG. 5); and it is at the ball portions 38 of pins 36 that the latter are operated in transmitting torque from member 20 through the normally spring-biased shoes 26, 27 to the output member of device 10 in the normal operation of the latter. It is also through the agency of the pins 36 that the shoes 26, 27 are spread to engage drum surface 16 and ground out excessive input torque when this occasion arises.

The brake shoes 26, 27 are normally urged towards one another under a very substantial predetermined and adjustably pre-set force by means of a radially acting spring unit, generally designated by the reference numeral 40, which is disposed at the axial center line of the shoes. The unit 40 is best shown in FIGS. 4 and 5.

In order to receive it, the radial extending end flange portions 32 of shoes 26, 27 are each axially relieved at a concave, mildly rounded bay 42 extending radially outwardly of the shoe's body portion 30; and each of the latter is provided with a radial through bore 43 and enlarged counterbore 44 at its axial midpoint between flanges 32. The bores 43 receive the elongated shank of the hex-headed bolt 46; while the counter-bores 44 each receive an assembly or pile of oppositely oriented Belleville springs 47 surrounding the bolt shank. A nut 48 threaded on to the bolt end and a cotter pin 49 applied through the latter completes the brake shoe biasing spring assembly 40; and the latter strongly contracts shoes 26, 27 toward one another and against the pins 36, leaving the substantial clearance 33, referred to above, between the shoe flanges 32 and brake drum surface.

The reference numeral 50 generally designates the output member of the device 10. It comprises a hollow cylindrical body 51 externally journaled by a pair of ball bearings 52 in axial extension 53 of the housing 11 of clutch device 10. An external annular sealing ring 54 is interposed in the space between output member 51 and housing extension 53; and an O-ring equipped sealing disc 55 is disposed snugly within the hollow interior of body 51.

Output member 50 has an enlarged diameter radial flange 57 of cylindrical section just within the radial wall 58 of housing 11, which flange affords means to effect a positive driving connection to output member 50 from the assembly of brake shoes 26, 27 and spring unit 40 acting thereon, which driving connection is effective in the normal torque transmitting operation of device 10 in either rotative direction.

To this end, reference being had to FIG. 3 in conjunction with FIGS. 2 and 5, output member flange 57 is formed to provide a pair of diametrically opposed and aligned, radially extending slots 60; and a pair of axially extending drive ears or lugs 61 are integrally formed on the adjacent side of each of the brake shoes 26, 27, the lugs 61 mating with relatively small side clearance into the slots 60, thus to form a clutch dog type of drive connection to output member 50. A reduced diameter stem portion 62 of the latter is externally splined to drivingly engage another output or driven member (not shown).

In ordinary operation, the force exerted by the Belleville type spring unit 40 and urging brake shoes 26, 27 radially together is sufficient to prevent their being spread into frictional braking engagement with the housing drum surface 16. This is the case under normal rated power input from the driver member 20 to shoes 26, 27, at the pin and seat connections 36, 34 of the latter, and from the shoes to output member 50, at the lug and slot connections 60, 61. However, under a predetermined excess of input power, the pins 36 are oppositely tilted reactively on their seats 34, exerting spreading effort on the shoes 26, 27, with the result that the latter are brakingly engaged with drums 16; and the excess input power is instantaneusly grounded out.

It has been illustrated and explained in my Patent No. 3,414,095 identified above, how larger and smaller effective forces $R_1$ and $R_2$, respectively, as transmitted back in the above operation from the output member to the shoes, are effective at those shoes in the spreading thereof against a brake drum. Briefly, the force $R_1$ exceeds the force $R_2$ by a factor involving the axial width of the brake shoes, i.e., the axial spacing of points on the shoes at which the reaction is received from the load-connected pins.

Similar considerations are involved in the reception of reactive effort by shoes 26, 27 from pins 36. The nature of these larger and smaller reactions $R_1$ and $R_2$ is schematically indicated in FIG. 4, in general regard to magnitude, and in FIG. 5, in general regard to placement. That is, the larger force $R_1$ is applied to shoes 26, 27 adjacent the ball ends 38 of pins 36, as indicated in FIG. 5, and the smaller force is adjacent the opposite pin ends.

Therefore, in order to achieve uniform loading of the shoes 26, 27 against drum surface 16, in respect to the axial width of the shoes when excess torque is being grounded out, the recesses 34 of the shoes are relieved or enlarged somewhat at 64 (see FIG. 5) at the axial end of the shoe at which the larger reactive force $R_1$ is applied. The relief 64 compensates for the higher direct loading of the shoe in this general zone; and consequently the braking friction, as applied along the axial width of drum surface 16, is uniform.

As indicated above, an important feature of the invention contemplates that this friction effort be applied at four localized zones, two on each of the shoes 26, 27 through the agency of hardened inserts 66, for example of silicon carbide or chrome-treated steel. They are approximately semi-cylindrical in cross section and co-extensive in axial demension with that of the shoe body portion 30; and are accurately cradled in quasi-cylindrical concave seats 67 in the brake shoe flanges 32. Their outer surfaces are arcuate on a curve matching the radius of curvature of the drum surface 16.

The inserts provide easily replaceable wear surfaces of extreme hardness. Moreover, as indicated above, the individual inserts greatly improve the performance of the clutch in regard to output lash, input lash, slip factor, and efficiency, all subject to deterioration in the event of appreciable wear of brake contact surfaces such as is to be expected in existing designs.

Thus, referring specifically to FIG. 4 (and as expounded at greater length in my Patent No. 3,414,095, the total reaction force received from output side 50 equals $R_1 + R_2$, one half of which must be opposed by each of the shoes 26, 27; and, in the case of solid shoes lacking the inserts 66, the opposition is exerted at diagonally opposite brake drum engaging surfaces of the shoes, and, more particularly, at circumferential edges of the shoes which are remote from the center split therebetween.

Again referring to FIG. 4, in reference to the forces which are involved in the braking, grounding out or backstopping action, it is seen that a reactive force $$\frac{R_1+R_2}{2}$$

must be met at the drum and shoe surface by an equal and opposing friction force in the circumferential sense.

Accordingly, it is also seen that if $a$ is the angle between a plane through a point on the shoe at which the reactive force $$\frac{R_1+R_2}{2}$$

is effectively met (i.e., at a shoe edge in an insert-less shoe) and a plane medial of the shoes and including their axis, then the needed braking effort will equal $$\frac{R_1+R_2}{2 \sin a}$$

It is therefore desirable to have the angle $a$ as small as possible for the most efficient atttack of the radial braking forces on drum surface 16.

Now, in an insert-free brake shoe unit the angle $a$ is one between the centerline along the split of the shoe assembly and a line through the "high wear" corner of the contact area with the outer race, which angle would generally be in the range of 10 to 25 degrees, as, indicated above. As slight wear occurs at this critical corner, the split between the shoes opens up considerably, thus increasing the angle $a$ and the output lash and decreasing the "slip factor" and input lash.

However, due to the inserts 66 the angle $a$ is defined on one side by a line through the circumferential center of the insert. For any given angle $a$ the contact surface is not only doubled, it is also extended past the former critical wear point of the solid shoe and into a steeper portion of the brake drum surface 16, with a resultant multiplication of the force exerted by the shoes on the drum. This is over and above the force multiplication attributable to the mechanical advantage of the pins 36 as they tilt on their seats 34 to spread the shoes.

FIGS. 6 and 7 illustrate an adaptation of the shoe insert principle of the invention to a clutch device, generally designated 70, which is of the same general type as is illustrated and described in my patents identified above. It includes a fixed housing 71 affording an internal cylindrical brake drum or race surface 72. As in the first embodiment, this surface is helically grooved at 72' for lubrication or cooling. Ball bearings 73 within the opposite ends of housing 71 respectively journal a power input or drive member 74 and a power output or driven member 75.

A pair of radially spaced, generally semi-cylindrical brake shoes 77 are disposed within housing 71 in the axial space between parallel, radially extending flanges 78, 79 integral with the input member 74; and these shoes are urged radially away from one another by a pair of coil compression springs 80, as shown in FIG. 7. This is, of course, in contrast to the no-back embodiment 10 of the device shown in FIGS. 1–5, inclusive, in which the insert-mounting shoe members 26 and 27 are spring biased toward one another.

The flanges 78, 79 of power input member 74 are each provided with two pairs of axially aligned and extending holes 82, which receive the ends of like parallel drive pins 83; and each of the shoes 77 has a pair of relatively large bores 84 (FIG. 6) receiving a right hand shank portion of a pin 83 with substantial radial clearance. Each of the pins 83 is, furthermore, surrounded by a relatively large diameter anti-friction roller 85, which roller is, as shown in FIG. 7, received in an eccentric opening 86 in the shoe, just to the left (FIG. 6) of bore 84.

Thus, rotative driving force is transmitted from the pins 83 (depending upon the direction of the force) to the respective shoes 77, as the anti-friction rollers 85 ride up on the eccentric ramp surface of a shoe opening 86, in the manner illustrated and described in my Patent No. 3,335,831. Coincident with this application of drive force, shoes 77 are urged out of effective frictional engagement with drum surface 72, also in the manner described in that application. The driving effort is applied at two points on each shoe, per my Patent No. 3,414,095, rather than at one point, as in my Patent No. 3,335,831.

As shown best in FIG. 7, the output member 75 carries ball-headed force receiving and reaction pintles 88 on opposite diametral sides of the axis of the device, which pintles are received in arcuate seats 89 on the inner chordal surfaces 90 of shoes 77, just as in the case of my patents identified above; and their action, upon the arisal of an excessive load torque tending to feed back from the driver 75 to the input 74 is the same. They separate the shoes 77 to ground out the feedback against drum surface 72.

As in the no-back embodiment of FIGS. 1–5, the major peripheral surface of shoes 77 is well out of radial engagement with surface 72. Instead, that surface is frictionally engaged by hardened inserts 92, one pair for each shoe, swivelled in arcuate seats 93 located adjacent to the ends of the chordal surfaces 90 of the shoes.

When the feedback torque diminishes adequately, the drive of output member 75 through shoes 77 and pins 83 from input member 74 resumes, with the shoes being again biased away from drum surface 72 by the pin rollers 85 riding the eccentric ramp surface 86. It is evident that the shoe inserts 92 possess all of the advantages discussed above in connection with the device 10. It is also evident that the antifriction rollers 85 act in the desirable way discussed in my Patent No. 3,414,095, to apply the input torque from member 74 to the shoes 77 in a zone adjacent the output member 75, with a resultant improved balancing, axial-wise, of the force transmitted to and through the shoes.

FIG. 8 of the drawings illustrates an alternative mode of utilizing the shoe insert feature, for example, in a manual override type of clutch control, such as is illustrated in FIGS. 7 and 8 of my Patent No. 3,335,831. Reference may be had to that patent in connection with many structural features of the embodiment of FIG. 8, which is generally designated 95.

Thus, the reference numeral 96 generally designates a drum such as is ordinarily operated through the agency of an appropriate servo-drive input mechanism (not shown), drum 96 presenting an internal cylindrical and normally rotatable brake surface 97.

Pursuant to Patent No. 3,335,831, as well as the Candela patent identified above, the servo-drive obtains, in the normal operation, for example, of any one of the engines of a multiple engine aircraft, which drive it may be desired to override under manual effort by the pilot. A system of this sort is also the subject matter of the patent to Greene No. 2,881,635 of Apr. 14, 1959.

To this end, a pair of radially spaced, brake-mounting members 98 of a skeletonized nature are provided, the members being operated by manual override pins 100, carried by a pilot-operated override input disc member 100' otherwise not shown. Pins 100 are received in eccentric ramp openings 100'' in mounting members 98, in the same fashion as the pin rollers 85 of the embodiment of FIGS. 6 and 7.

Shoe members 98 are urged or energized radially away from one another by leaf spring members 101 of the sort illustrated and described in my Patent No. 3,414,095. Moreover, in the general manner described in my Patent No. 3,335,831 and in the Candela patent, the manual override controlled mounting members 98 are biased away from one another by a third leaf spring 102, which acts in identical, axially aligned slots 102' in the manual override-controlled input disc member 100', and the output side of the device represented by a second disc member 103.

The effect is to neutralize or centralize the input and output members upon cessation of override torque, permitting said members to return to a normal position relation to one another. Springs 102 are equipped with wear-receiving pegs 103' at the ends thereof which engage the input and output members.

The skeleton-type mounting members 98 are provided with radial arms 104 adjacent the split between the members; and each such arm has an arcuate seat 105 receiving a hardened insert 106 for engagement with drum surface 97. The latter is helically grooved at 97'. Otherwise, the arms are out of engagement with that surface. Manual override torque is transmitted from the insert bearing members 98 to output disc 103 through the agency of pins 107 on the latter.

FIG. 9 illustrates a still further embodiment generally designated 108, in which the inter-shoe pins of the other forms are replaced by a simpler, tang-type driven member.

Device 108 includes a pair of drive pins 109 for each generally semi-cylindrical shoe 110, with anti-friction rollers 111 applied to the pins; and the rollers ride the ramp surfaces of eccentric holes 112 in the shoes, as in earlier forms. Likewise, the shoes each carry a pair of hardened inserts 113 engaging the grooved interval brake or race surfaces of a drum 114, being urged radially outward by coil springs 115.

The output or driven member of the device 108 is in the form of an axially extending fork-like tank 117 presenting a pair of integral, radially spaced tang arms 118 in the diametral space between opposing flat, parallel surfaces 119 of shoes 110; and these surfaces exert driving torque to the arms 118 of output tang member 117. The shoes are each provided with a lightening hole 120.

Operationally, the device corresponds to the embodiment of FIGS. 6 and 7, in which the output is through pairs of inter-shoe pintles. It lacks the factor of mechanical advantage or force multiplictaion which these contribute, but it is structurally simpler, more compact and less costly of production; and it is fully qualified for many installations.

What is claimed is:

1. A device of the type described, comprising means providing an annular, radially inwardly facing drum surface, a shoe assembly disposed radially within said surface, and means to transmit normal rotary torque through said shoe assembly from an input member to an output member coaxial with said surface, said shoe assembly comprising a pair of mounting members spaced radially inwardly of the drum surface and separated radially from one another, said mounting members each having a pair of radially outwardly facing, concave seats adjacent the zone of separation of the mounting members from one another, and a hard insert disposed in each of said seats, said inserts each having an arcuate inner surface mated in the seat for a swivel action therein, and an arcuate outer surface which is of the same curvature as the drum surface and is frictionally engageable with the latter, said inserts being moved radially relative to said drum surface by said respective mounting members in a phase of operation of the device.

2. The device of claim 1, and further comprising spring means resiliently biasing said mounting members to urge the inserts thereof away from said drum surface.

3. The device of claim 1, and further comprising spring means resiliently biasing said mounting members to urge the inserts thereof away from said drum surface, said spring means comprising a stud unit extending through radially aligned bores in said mounting members, and Belleville springs surrounding said stud unit and acting radially between the ends of the latter and the respective mounting members to urge the latter radially toward one another.

4. The device of claim 1, and further comprising spring means resiliently biasing said mounting members to urge the inserts thereof against said drum surface.

5. The device of claim 1, and further comprising a pair of power transmitting pins disposed between said mounting members to engage and actuate or be actuated by adjacent surfaces of the latter in the said relative radial movement of the inserts.

6. The device of claim 5, in which said drum surface is grooved to receive a lubricant or coolant.

7. The device of claim 1, and further comprising a flattened power transmitting tang disposed between said mounting members to engage and actuate or be actuated by adjacent surfaces of the latter in the said relative radial movement of the inserts.

8. The device of claim 7, in which said drum surface is grooved to receive a lubricant or coolant.

9. The device of claim 1, in which said drum surface is grooved to receive a lubricant or coolant.

10. A device of the type described, comprising means providing an annular, radially inwardly facing drum surface, a shoe assembly disposed radially within said surface, and means to transmit normal rotary torque through said shoe assembly from an input member to an output member coaxial with said surface, said shoe assembly comprising a pair of mounting members spaced radially inwardly of the drum surface and separated radially from one another, said mounting members each having a pair of radially outwardly facing, concave seats adjacent the zone of separation of the mounting members from one another, and a hard insert disposed in each of said seats, said inserts each having an arcuate inner surface mated in the seat for a swivel action therein, and an arcuate outer surface which is of the same curvature as the drum surface and is frictionally engageable with the latter, and spring means resiliently biasing said mounting members radially relative to one another and said drum surface, one of said input and output members having a pair of power transmitting pins disposed between said mounting members and acting to move the latter and the inserts thereon radially relative to said drum surface under driving torque on said one member and in opposition to the bias of said spring means, said mounting members having means providing a drive connection between the same and the other of said input and output members.

11. The device of claim 10, in which said spring means comprises a stud unit extending through radially aligned bores in said mounting members, and a Belleville spring surrounding said stud unit and acting radially on the respective mounting members to urge the latter radially.

12. The device of claim 10, in which said spring means acts on said mounting members to urge the latter and the inserts thereof toward the drum surface.

13. The device of claim 11, in which said spring means acts on said mounting members to urge the latter and the inserts thereof toward the drum surface.

14. The device of claim 11, in which said Belleville spring acts on said mounting members to urge the latter and the inserts thereof away from the drum surface.

15. The device of claim 10, and further comprising means biasing said input and output members rotatively relative to one another to a normal angular relationship upon cessation of said driving torque.

16. A device for the overload-free transmission of rotary power from an input member to an output member, comprising an annular drum surface, and a friction shoe assembly positioned radially within said drum surface and adapted to radially engage the latter to ground out an overload, said assembly including a pair of radially spaced shoe members having drive means operatively connecting the same between said input and output members in a normal phase of transmission of said power, and spring means normally biasing said shoe members radially toward one another and away from frictional engagement with said drum surface, said drive means comprising at least one power transmitting element drivingly connected to one of said input and output members to move positively therewith about the axis of said drum surface in said normal transmission phase, said shoe members having further means providing a positive drive connection thereof to the other of said input and output members, said element acting against the bias of said spring means to urge said shoe members radially into frictional engagement with said drum surface to ground out against the latter an excessive torque from the input member to the output member, or vice versa, in which said shoe members are out of radial engagement with said drum surface, each being provided with a pair cf hard inserts swiveled in arcuate seats thereof radially facing the drum surface at points adjacent a diemetrical line between the shoe members.

17. A device for the overload-free transmission of rotary power from an input member to an output member, comprising an annular drum surface, and a friction shoe assembly positioned radially within said drum surface and adapted to radially engage the latter to ground out an overload, said assembly including a pair of radially spaced shoe members having drive means operatively connecting the same between said input and output members in a normal phase of transmission of said power, and spring means normally biasing said shoe members radially toward one another and away from frictional engagement with said drum surface, said drive means comprising a pair of drive pins paralleling the axis of said drum surface and drivingly connected to said input member to move positively therewith about said drum surface axis in said normal transmission phase, said pins extending between said shoe member and the latter having seats receiving the pins therebetween, said shoe members having further means providing a positive drive connection thereof to said output member, said pins being tilted on said seats and against the bias of said spring means to urge said shoe members radially into frictional engagement with said drum surface to ground out against the latter an excessive torque from the input member to the output member.

18. The device of claim 17, in which said shoe members are out of radial engagement with said drum surface, each being provided with a pair of hard inserts.

19. The device of claim 17, in which said shoe members are out of radial engagement with said drum surface, each being provided with a pair of hard inserts swiveled in arcuate seats thereof radially facing the drum surface at points adjacent a diametrical line between the shoe members.

20. A device of the type described, comprising means providing an annular, radially facing friction surface, a rotative shoe assembly, means to transmit rotary torque through said shoe assembly and coaxially of said surface from an input member to an output member, said shoe assembly comprising at least one mounting member spaced radially relative to said friction surface and movable radially in relation to the latter, said mounting member having a concave seat radially facing said friction surface, and a hard insert disposed in said seat, said insert having an arcuate surface mated in the said concave seat for a swivel action therein, and a surface opposite said arcuate surface which is frictionally engageable with the said friction surface, and means to move said mounting member radially relative to said friction surface, said insert being moved radially relative to said friction surface by said mounting member in a phase of operation of the device.

21. The device of claim 20, in which there are a pair of said mounting members separated radially from one another and each having a pair of said concave seats located respectively adjacent the zone of separation of the mounting members, there being one of said inserts swiveled in each seat.

22. The device of claim 21, and further comprising spring means resiliently biasing said mounting members radially away from said friction surface.

23. The device of claim 21, and further comprising spring means resiliently biasing said mounting members radially toward said friction surface.

24. A device of the type described, comprising means providing an annular, radially facing friction surface, a rotative shoe assembly, and means to transmit rotary torque through said shoe assembly and coaxially of said surface from an input member to an output member, said shoe assembly comprising a pair of mounting members spaced radially relative to said friction surface and separated radially from one another, each said mounting members having a pair of concave seats located respectively adjacent the zone of separation of the mounting members and radially facing said friction surface, and a hard insert disposed in each seat, said insert having an arcuate surface mated in the said concave seat for a swivel action therein, and a surface opposite said arcute surface which is frictionally engageable with the said friction surface, said insert being moved radially relative to said friction surface by said mounting member in a phase of operation of the device.

25. The device of claim 24, and further comprising spring means resiliently biasing said mounting members radially away from said friction surface.

26. The device of claim 24, and further comprising spring means resiliently biasing said mounting members radially toward said friction surface.

References Cited

UNITED STATES PATENTS

| | | | |
|---|---|---|---|
| 3,034,619 | 5/1962 | Glasgow et al. | 192—7 |
| 3,102,618 | 9/1963 | Lund | 192—8 |
| 3,329,242 | 7/1967 | Minarick et al. | 192—7 X |
| 1,512,862 | 10/1924 | Sayre. | |
| 1,617,745 | 2/1927 | Cousinard | 192—8 |
| 2,635,714 | 4/1953 | Butler | 188—240 X |
| 3,051,282 | 8/1962 | Greene | 192—8 |
| 3,219,154 | 11/1965 | Schenck et al. | |

BENJAMIN W. WYCHE III, Primary Examiner

U.S. Cl. X.R.

188—134, 251; 192—7, 107